United States Patent [19]

Kimura et al.

[11] Patent Number: 4,760,255
[45] Date of Patent: Jul. 26, 1988

[54] RADIATION IMAGE RECORDING AND READ-OUT APPARATUS

[75] Inventors: Tsutomu Kimura; Tokukazu Saito; Masamitsu Ishida, all of Kanagawa, Japan

[73] Assignee: Fuji Photo Film Co., Ltd., Kanagawa, Japan

[21] Appl. No.: 755,993

[22] Filed: Jul. 17, 1985

[30] Foreign Application Priority Data

Jul. 20, 1984 [JP] Japan .................................. 59-150995
Oct. 16, 1984 [JP] Japan .................................. 59-216908

[51] Int. Cl.⁴ .................................................. G03C 5/16
[52] U.S. Cl. .................................. 250/327.2; 250/484.1
[58] Field of Search ........................... 250/327.2, 484.1

[56] References Cited

U.S. PATENT DOCUMENTS

| 4,500,783 | 2/1985 | Kato | 250/327.2 |
| 4,543,479 | 9/1985 | Kato | 250/327.2 |
| 4,578,582 | 3/1986 | Takano | 250/327.2 |

Primary Examiner—Janice A. Howell
Assistant Examiner—Richard E. Hanig
Attorney, Agent, or Firm—Sughrue, Mion, Zinn, Macpeak & Seas

[57] ABSTRACT

A radiation image recording and read-out apparatus is provided with a body comprising a system for conveying stimulable phosphor sheets for recording radiation images along a path, and an image recording section and an image read-out section which are positioned on the path. The apparatus body is provided with a section positioned at the upstream end of the path for feeding the stimulable phosphor sheets to the sheet conveying system, and a section positioned at the downstream end of the path for ejecting the stimulable phosphor sheets from the sheet conveying system. Or, the apparatus body is connected by conveyor belts with an erasing unit for erasing radiation energy remaining in the stimulable phosphor sheets after image read-out. The apparatus body and the erasing unit are positioned independently of each other in spaced relation by a predetermined distance.

8 Claims, 3 Drawing Sheets

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through an object to have a radiation image of the object stored therein, exposing the stimulable phosphor sheet to stimulating rays which cause them to emit light in proportion to the stored radiation energy, and detecting and converting the emitted light into electric signals.

2. Description of the Prior Art

When certain kinds of phosphors are exposed to a radiation such as X-rays, α-rays, β-rays, γ-rays, or cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

In order to reuse stimulable phosphor sheets of the type described above, the radiation energy remaining on the stimulable phosphor sheet after it is scanned with stimulating rays to read out the radiation image stored therein should be erased by exposure to light or heat as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Patent Application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, having said stimulable phosphor sheet release the radiation energy remaining in said stimulable phosphor sheet, whereby said stimulable phosphor sheet is circulated through said image recording section, said image read-out section and said erasing section and reused for radiation image recording.

Since the radiation image recording and read-out apparatus constructed as described above can continuously and efficiently conduct radiation image recording and read-out, it is suitable for mass medical examinations and for loading on a mobile X-ray diagnostic station in the form of a vehicle like a bus for the purposes of mass medical examinations or the like.

In the aforesaid radiation image recording and read-out apparatus, the erasing section is fabricated for exposing the stimulable phosphor sheet to erasing light or heat. When erasing light is used, in order to make the stimulable phosphor sheet practically reusable for image recording, the stimulable phosphor sheet must be exposed to a large light amount (illuminance×time), for example, to 10,000 1× for 100 seconds. In order to shorten the image erasing time, an erasing light source having as high an output (high illuminance) as possible should be installed at the erasing section. However, in this case, the apparatus becomes large, a power source of a high capacity is necessary, and the large amount of heat generated by the erasing light source has an adverse effect on the other sections of the apparatus. Therefore, the level of the output of the erasing light source has to be limited. Thus in the aforesaid radiation image recording and read-out apparatus, even though the image recording and image read-out processing speeds are increased, the processing speed of the overall apparatus cannot be increased substantially, because a long time is required for image erasing at the erasing section.

SUMMARY OF THE INVENTION

The primary object of the present invention is to provide a radiation image recording and read-out apparatus which continuously and efficiently conducts recording and read-out of a radiation image and which is compact.

Another object of the present invention is to provide a radiation image recording and read-out apparatus wherein image recording and read-out processing speeds are increased substantially.

The specific object of the present invention is to provide a radiation image recording and read-out apparatus wherein image recording, read-out and erasing speeds are substantially increased as a whole.

The present invention provides a radiation image recording and read-out apparatus comprising:

(i) a sheet conveying means for conveying at least one stimulable phosphor sheet for recording a radiation image thereon along a predetermined path, (ii) an image recording section positioned on said path for recording the radiation image of an object on said stimulable phosphor sheet by exposing said stimulable phosphor sheet to a radiation passing through said object, (iii) an image read-out section positioned on said path on the downstream side of said image recording section in the sheet conveyance direction and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, (iv) a sheet feeding section positioned at an upstream end of said path in the sheet conveyance direction for feeding said stimulable phosphor sheet to said sheet conveying means, and (v) a sheet ejecting section positioned at a downstream end of said path in the sheet conveyance direction for ejecting said stimulable phosphor sheet from said sheet conveying means after said stimulable phosphor sheet passes through said image read-out section.

The present invention also provides a radiation image recording and read-out apparatus comprising:

(a) a recording and read-out apparatus body constituted by integrally incorporating therein:

(i) a first sheet conveying means for conveying at least one stimulable phosphor sheet for recording a radiation image thereon along a predetermined path, (ii) an image recording section positioned on said path for recording the radiation image of an object on said stimulable phosphor sheet by exposing said stimulable phosphor sheet to a radiation passing through said object, and (iii) an image read-out section positioned on said path on the downstream side of said image recording section in the sheet conveyance direction and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (b) an erasing unit for, prior to next image recording on said stimulable phosphor sheet for which the image read-out has been conducted at said image read-out section, having said stimulable phosphor sheet release the radiation energy remaining in said stimulable phosphor sheet, wherein (c) said recording and read-out apparatus body and said erasing unit are positioned independently of each other in spaced relation by a predetermined distance, and (d) said path in said recording and read-out apparatus body is connected on the downstream side of said image read-out section in the sheet conveyance direction with a sheet inlet of said erasing unit by a second sheet conveying means, and is connected on the upstream side of said image recording section in the sheet conveyance direction with a sheet outlet of said erasing unit by a third sheet conveying means.

In the radiation image recording and read-out apparatus of the present invention mentioned first, since the image recording section and the image read-out section are connected by the sheet conveyance path, and the stimulable phosphor sheets are automatically conveyed and fed to the image recording section and the image read-out section, it is possible to record and read out the radiation images continuously and efficiently. Also, the stimulable phosphor sheets after the image read-out are sequentially ejected from the sheet ejecting section of the apparatus, and subjected to image erasing in an erasing unit installed independently of the radiation image recording and read-out apparatus. The stimulable phosphor sheets after image erasing are sequentially fed to the radiation image recording and read-out apparatus from the sheet feeding section, and reused for image recording. Since the image erasing, which takes comparatively long time, is conducted outside of the radiation image recording and read-out apparatus, the recording and read-out processing speeds for the radiation images may be increased substantially. Further, since the radiation image recording and read-out apparatus of the present invention has no image erasing section, the power consumption is low and the apparatus is suitable particularly for loading on a mobile X-ray diagnostic station for the purposes of mass medical examinations or the like.

In the second mentioned radiation image recording and read-out apparatus of the present invention, since the image recording section, the image read-out section and the erasing unit are connected by the sheet conveying means and the stimulable phosphor sheets are circulated by the sheet conveying means through the image recording section, the image read-out section and the erasing unit, it is possible to use the sheets repeatedly and to conduct the radiation image recording and read-out continuously and efficiently. Also, since the erasing unit is separated from the recording and read-out apparatus body, it is free from various limitations and can be provided with increased erasing capacity. As a result, it becomes possible to shorten the erasing time and to markedly increase the processing speed of the overall apparatus.

DESCRIPTION OF THE PREFERRED EMBODIMENTS

The present invention will hereinbelow be described in further detail with reference to the accompanying drawings.

Figure 1:
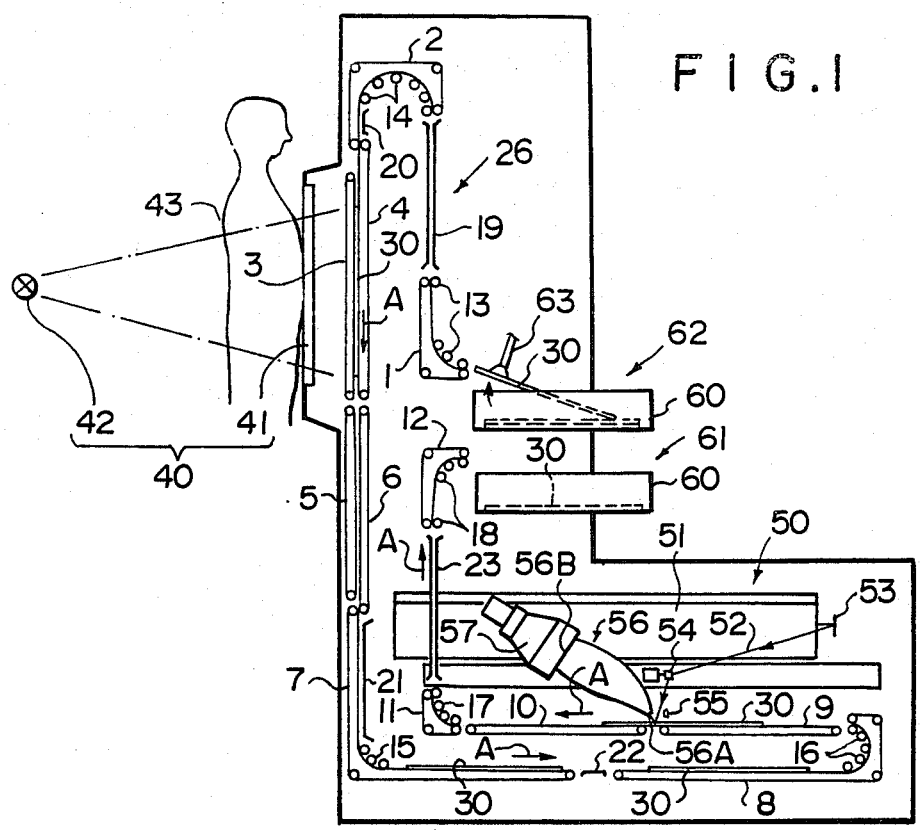
FIG. 1 is a schematic side view showing an embodiment of the radiation image recording and read-out apparatus in accordance with the present invention.

Referring to FIG. 1, a sheet conveyance path 26 is constituted by endless belts 1, 2, 3, 4, 5, 6, 7, 8, 9, 10, 11 and 12, guide rollers 13, 14, 15, 16, 17 and 18 rotated respectively by the endless belts 1, 2, 7, 8, 11 and 12, and guide plates 19, 20, 21, 22 and 23. A plurality of stimulable phosphor sheets 30 are positioned in spaced relation to each other on the sheet conveyance path 26 and are conveyed in the direction as indicated by the arrow A by the endless belts 1 to 12 as the sheet conveying means.

The endless belts 3 and 4 are positioned to vertically hold the stimulable phosphor sheet 30 therebetween. An image recording section 40 is constituted by an image recording stand 41 positioned on the left side of the endless belts 3 and 4, and a radiation source 42, e.g. an X-ray source, spaced from the image recording stand 41 to stand face to face with the endless belts 3 and 4. For recording a radiation image of an object 43 on the sheet 30, the sheet 30 is held between the endless belts 3 and 4, and the radiation source 42 is activated with the object 43 standing in front of the image recording stand 41. In this manner, the sheet 30 is exposed to a radiation passing through the object 43 to have a radiation image of the object 43 stored in the sheet 30.

An image read-out section 50 is positioned at the lower section of the sheet conveyance path 26. At the image read-out section 50, a laser beam source 51 is positioned above the endless belt 9 constituting a part of the image read-out section 50, and a mirror 53 and a galvanometer mirror 54 are positioned for scanning a laser beam 52 emitted by the laser beam source 51 in the width direction of the sheet 30 placed on the endless belt 9. The galvanometer mirror 54 is swung in both ways to scan the laser beam 52 in the main scanning direction on the sheet 30 carrying the radiation image stored therein. The sheet 30 has been subjected to image recording at the image recording section 40 and then conveyed by the sheet conveying means to the image read-out section 50. A light guiding reflection mirror 55 and a light guide member 56 are positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly towards the light guide member 56 and the light emitted by the sheet 30 and reflected by the light guide reflection mirror 55 enter the light guide member 56 from a light input face 56A thereof, and is guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet 30 is moved by the endless belt 9 in the sub-scanning direction, as indicated by the arrow A, approximately normal to the main scanning direction, so that the whole surface of the sheet 30 is scanned by the laser beam 52. The electric image signal produced by the photomultiplier 57 is sent to an image processing circuit (not shown) for processing. The image signal thus processed is then sent to an image reproducing apparatus (not shown). The image reproducing apparatus may be a display device such as a CRT, or a device for recording a visible image by point-by-point scanning on a photographic film. Or, the image signal may be stored in a storage means such as a magnetic tape.

After image read-out is finished, the sheet 30 is conveyed by the endless belts 10 and 11 along the guide plate 23 and is sent by the endless belt 12 into a magazine 60 which is positioned at a sheet ejecting section 61 releasably from the recording and read-out apparatus body. After the sheets 30 which have passed through the image read-out step are loaded into the magazine 60, they can be removed from the radiation image recording and read-out apparatus as housed in the magazine 60.

Figure 2:
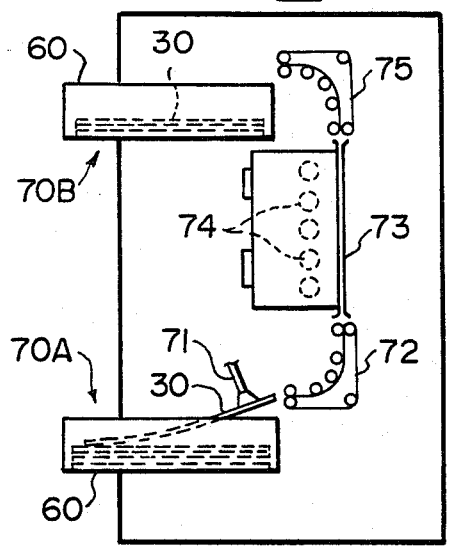
FIG. 2 is a schematic side view showing an example of the image erasing unit for erasing a residual image on the stimulable phosphor sheet used in the apparatus of FIG. 1.

The magazine 60 removed from the sheet ejecting section 61 is loaded into an image erasing unit 70 as shown in FIG. 2, and images remaining on the stimulable phosphor sheets 30 housed after image read-out in the magazine 60 are erased. Specifically, when the magazine 60 is fitted to a sheet receiving section 70A of the image erasing unit 70, the sheets 30 in the magazine 60 are taken up one by one by a sheet feeding mechanism 71 comprising a moveable suction cup or the like. After being taken up the sheet is conveyed upwardly by an endless belt 72 along a guide plate 73. An erasing light source 74 comprising, for example, many fluorescent lamps is positioned to stand face to face with the guide plate 73 and emits erasing light onto the sheet 30 conveyed along the guide plate 73. When the sheet 30 is exposed to the erasing light, the radiation energy remaining therein is released, and the residual image on the sheet 30 is thus erased. After the image erasing, the sheets 30 are conveyed by an endless belt 75 into a different magazine 60 fitted to a sheet ejecting section 70B of the image erasing unit 70.

The magazine 60 loaded with a predetermined number of the sheets 30 after the image erasing is fitted to a sheet feeding section 62 of the radiation image recording and readout apparatus shown in FIG. 1. The erased sheets 30 housed in the magazine 60 are taken out of the magazine 60 one by one by use of a sheet feeding mechanism 63 comprising a moveable suction cup or the like, and are fed by the endless belt 1 onto the sheet conveyance path 26. The sheets 30 fed to the sheet conveyance path 26 are sent along the guide plate 19, conveyed by the endless belts 2, 3 and 4 to the image recording section 40, and reused for recording radiation images as described above.

In the aforesaid embodiment, the sheets 30 which have passed through the image read-out step at the image readout section 50 are not erased in the apparatus but are ejected into the magazine 60 fitted to the sheet ejecting section 61, and new sheets 30 are fed from the sheet feeding section 62. Therefore, the radiation image recording and read-out apparatus is free from the problem that a long time is taken for image erasing. When many sheets 30 and many magazines 60 are used and image erasing for the sheets 30 is conducted by use of the image erasing unit 70 by efficiently utilizing the time for which the radiation image recording and read-out apparatus is not operated, it becomes possible to continuously conduct recording and read-out of radiation images.

In the present invention, the magazines 60 need not necessarily be used for ejection and feeding of the sheets 30. However, it is advantageous to use the magazines 60 for facilitating the sheet handling and improving the working efficiency.

Figure 3:
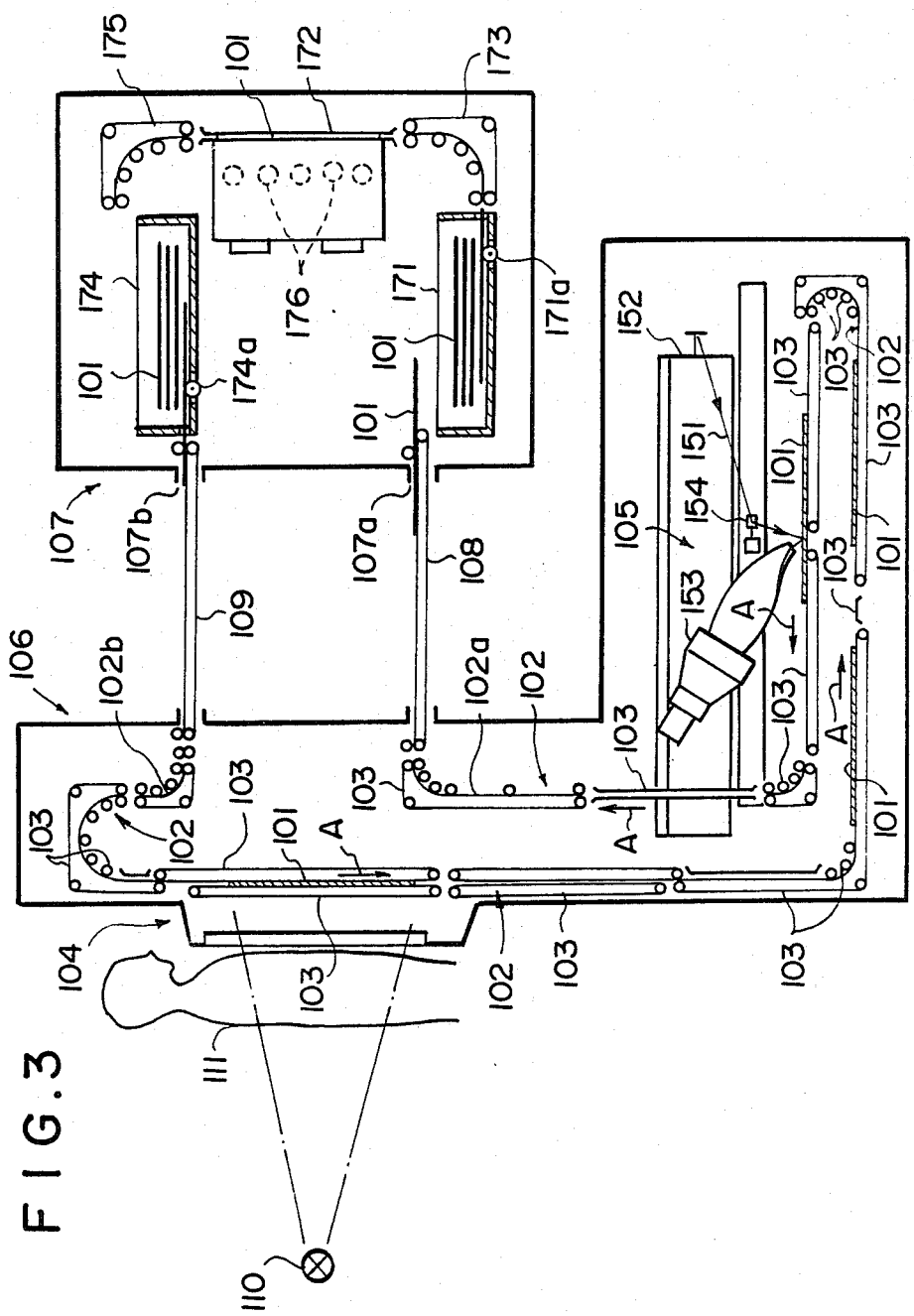
FIG. 3 is a schematic side view showing another embodiment of the radiation image recording and read-out apparatus in accordance with the present invention.

FIG. 3 shows another embodiment of the radiation image recording and read-out apparatus in accordance with the present invention. The apparatus comprises a recording and read-out apparatus body 106 and an erasing unit 107 positioned independently of the apparatus body 106 in spaced relation by a predetermined distance. The apparatus body 106 is fabricated by integrally incorporating therein a first sheet conveying means 103 composed of conveying rollers, conveyor belts and guide plates for conveying stimulable phosphor sheets 101 along a predetermined path 102, an image recording section 104 positioned on the path 102, and an image read-out section 105 positioned on the path 102 on the downstream side of the image recording section 104 in the sheet conveyance direction as indicated by the arrow A.

At the image recording section 104, the stimulable phosphor sheet 101 is exposed to a radiation emitted by a radiation source 110 and passing through an object 111 to have a radiation image of the object 111 stored in the sheet 101.

The sheet 101 is then conveyed by the first sheet conveying means 103 in the direction as indicated by the arrow A along the path 102 to the image read-out section 105.

The image read-out section 105 comprises a stimulating ray source 152 for emitting stimulating rays 151 such as a laser beam for scanning the sheet 101, and a photoelectric read-out means 153 constituted by a photomultiplier or the like for detecting light emitted by the sheet 101 when it is exposed to the stimulating rays 151 and converting the emitted light into an electric image signal. Reference numeral 154 denotes a galvanometer mirror.

The path 102 is connected on the downstream side 102a of the image read-out section 105 with a sheet inlet 107a of the erasing unit 107 by a second sheet conveying means 108 constituted by a belt conveyor. The path 102 is also connected on the upstream side 102b of the image recording section 104 with a sheet outlet 107b of the erasing unit 107 by a third sheet conveying means 109 constituted by a belt conveyor.

The erasing unit 107 comprises an inlet side stacker 171 for receiving the sheets 101 conveyed through the sheet inlet 107a by the second sheet conveying means 108, a subsidiary sheet conveying means 173 for conveying the sheets 101, which are sent from the inlet side stacker 171, into an erasing unit body 172, a subsidiary sheet conveying means 175 for taking the sheets 101 out of the erasing unit body 172 and conveying them into an outlet side stacker 174, and the outlet side stacker 174 for receiving the sheets 101 conveyed by the subsidiary sheet conveying means 175. The sheets 101 received by the outlet side stacker 174 are then sent through the sheet outlet 107b to the third sheet conveying means 109.

The erasing unit 107 is provided with many erasing light sources 176 constituted by fluorescent lamps, tungsten filament lamps, sodium lamps, xenon lamps, iodine lamps or the like.

Each of the stackers 171 and 174 stores a plurality of the sheets 101 and delivers them, in the order received by delivery rollers 171a and 174a.

In the embodiment of FIG. 3, the sheet 101 carrying a radiation image stored therein at the image recording section 104 is conveyed by the first sheet conveying means 3 in the direction as indicated by the arrow A, and the radiation image is read out of the sheet 101 at the image read-out section 105. Then, the sheet 101 is conveyed by the second sheet conveying means 108 to the erasing unit 107 at which the image remaining in the sheet 101 is erased. The sheet 101 is then conveyed by the third sheet conveying means 109 into the image recording section 104. Thereafter, the sheet 101 is circulated through the image recording section 104, the image read-out section 105 and the erasing unit 107 in the same manner.

The stackers 171 and 174 are not absolutely necessarily and one or both can be omitted. Moreover, when provided, they need not be installed in the erasing unit 107, but can be positioned outside of the erasing unit 107.

In the embodiment of FIG. 3, the single recording and read-out apparatus body 106 is connected with the single erasing unit 107. However, it is also possible to connect a plurality of recording and read-out apparatus bodies 106 with a single erasing unit 107. In this case, the second and third sheet conveying means 108 and 109 for connecting the recording and read-out apparatus bodies 106 and the erasing unit 107 with each other may be constituted as shown in FIG. 4.

Figure 4:
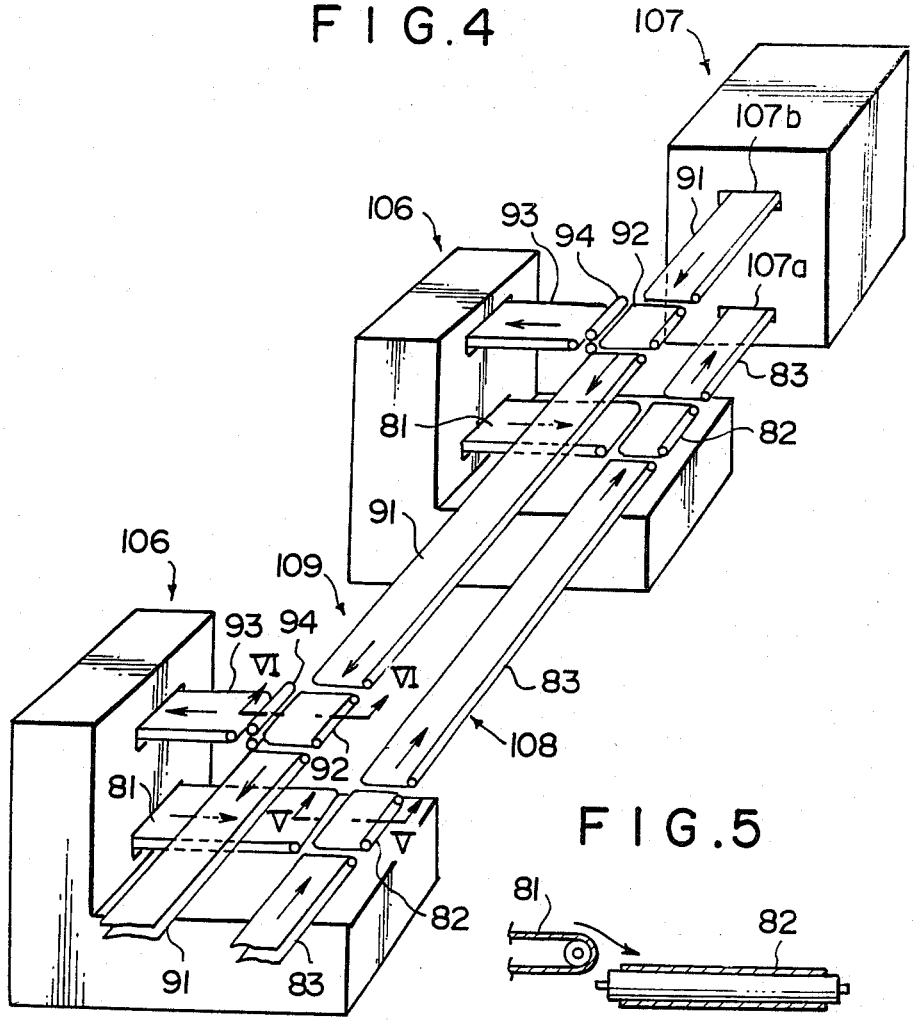
FIG. 4 is a perspective view showing a part of a further embodiment of the radiation image recording and read-out apparatus in accordance with the present invention.
Figure 5:
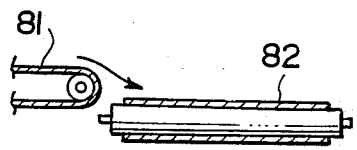
FIGS. 5 and 6 are sectional views taken along lines V—V and VI—VI of FIG. 4.

In FIG. 4, the third sheet conveying means 108 comprises outlet belt conveyors 81 connected with the first sheet conveying means of the recording and read-out apparatus bodies 106 on the downstream sides of the image read-out sections, relay belt conveyors 82, and main belt conveyors 83 for conveying the stimulable phosphor sheet to the inlet 107a of the erasing unit 107. As shown in FIG. 5, the outlet belt conveyors 81 and the relay belt conveyors 82 are positioned at different heights. When the stimulable phosphor sheets are delivered from the outlet belt conveyors 81 to the relay belt conveyors 82, the relay belt conveyors 82 are stopped. The relay belt conveyors 82 are driven after they receive the stimulable phosphor sheets.

Figure 6:
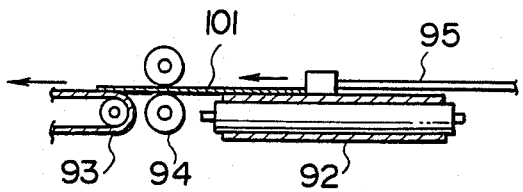

The third sheet conveying means 109 comprises main belt conveyors 91 for conveying the erased stimulable phosphor sheets from the outlet 107b of the erasing unit 107 to the recording and read-out apparatus bodies 106, relay belt conveyors 92, inlet belt conveyors 93 connected with the first sheet conveying means of the apparatus bodies 106 on the upstream sides of the image recording sections, and nip rollers 94 positioned between the relay belt conveyors 92 and the inlet belt conveyors 93. When the stimulable phosphor sheets are delivered from the main belt conveyors 91 to the relay belt conveyors 92, the relay belt conveyors 92 are stopped. As shown in FIG. 6, the sheets 101 are moved by pushing members 95 (not shown in FIG. 4) in the direction as indicated by the arrow, held by the nip rollers 94, and sent to the inlet belt conveyors 93. When the stimulable phosphor sheet is conveyed to the apparatus body 106 farther from the erasing unit 107, the relay belt conveyor 92 at the apparatus body 106 closer to the erasing unit 107 is not stopped and conveys the stimulable phosphor sheet to the next main belt conveyor 91.

When a plurality of the apparatus bodies 106 are connected with the single erasing apparatus 107 as in the embodiment mentioned last, it is advantageous that the stackers as shown in FIG. 3 be used. In this case, it becomes possible to temporarily store the erased stimulable phosphor sheets in the outlet side stacker and to sequentially supply the sheets to the apparatus bodies 106 which require the sheets. In this manner, it is possible to decrease the number of the sheets required as a whole, and the manner in which the sheets are used becomes uniform.

We claim:

1. A radiation image recording and read-out apparatus comprising:
   (a) a recording and read-out apparatus body constituted by integrally incorporating therein:
   (i) a first sheet conveying means for conveying at least one stimulable phosphor sheet for recording a radiation image thereon along a predetermined path,
   (ii) an image recording section positioned on said path for recording the radiation image of an object on said stimulable phosphor sheet by exposing said stimulable phosphor sheet to a radiation passing through said object, and
   (iii) an image read-out section positioned on said path on the downstream side of said image recording section in the sheet conveyance direction and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain electric image signal, and
   (b) an erasing unit for, prior to the next image recording on said stimulable phosphor sheet for which the image read-out has been conducted at said image read-out section, having said stimulable phosphor sheet release the radiation energy remaining in said stimulable phosphor sheet, wherein
   (c) said recording and read-out apparatus body and said erasing unit are positioned independently of each other in spaced relation by a predetermined distance, and
   (d) said path in said recording and read-out apparatus body is connected on the downstream side of said image read-out section in the sheet conveyance direction with a sheet inlet of said erasing unit by a second sheet conveying means, and is connected on the upstream side of said image recording section in the sheet conveyance direction with a sheet outlet of said erasing unit by a thrid sheet coveying means,
   said erasing unit comprising an inlet side stacker for receiving said stimulable phosphor sheets conveyed through said sheet inlet of said erasing unit by said second sheet conveying means, said inlet side stacker outputting the stimulable phosphor sheet that has been in said stacker for the longest time, a subsidiary sheet conveying means for conveying said stimulable phosphor sheets from said inlet side staker to an erasing section, a subsidiary sheet conveying means for taking said stimulable phosphor sheet out of said erasing section and conveying it to said sheet outlet of said erasing unit.

2. An apparatus as defined in claim 1 wherein said first sheet conveying means comprises conveying rollers, conveyor belts and guide plates.

3. An apparatus as defined in claim 1 wherein said path is L-shaped.

4. An apparatus as defined in claim 1 wherein said second sheet conveying means and said third sheet conveying means comprise belt conveyors.

5. An apparatus as defined in claim 1 wherein a plurality of said recording and read-out apparatus bodies are connected with the single erasing unit.

6. An apparatus as defined in claim 5 wherein a plurality of said recording and read-out apparatus bodies and said erasing unit are positioned in a row, and said erasing unit is positioned at one end of said row.

7. An apparatus as defined in claim 1, wherein said erasing unit further comprises and outlet side stacker positioned near said sheet outlet of said erasing unit, said output side stacker outputting the stimulable phosphor sheet that has been in said output side stacker for the longest time.

8. A radiation image recording and read-out apparatus comprising:
   (a) a recording and read-out apparatus body constituted by integrally incorporating therein:
   (i) a first sheet conveying means for conveying at least one stimulable phosphor sheet for recording a radiation image thereon along a predetermined path,
   (ii) an image recording section positioned on said path for recording the radiation image of an object on said stimulable phosphor sheet by exposing said stimulable phosphor sheet to a radiation passing through said object, and
   (iii) an image read-out section positioned on said path on the downstream side of said image recording section in the sheet conveyance direction and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and
   (b) an erasing unit for, prior to the next image recording on said stimulable phosphor sheet for which the image read-out has been conducted at said image read-out section, having said stimulable phosphor sheet release the radiation energy remaining in said stimulable phosphor sheet, wherein
   (c) said recording and read-out apparatus body and said erasing unit are positioned independently of each other in spaced relation by a predetermined distance, and
   (d) said path in said recording and read-out apparatus body is connected on the downstream side of said image read-out section in the sheet conveyance direction with a sheet inlet of said erasing unit by a second sheet conveying means, and is connected on the upstream side of said image recording section in the sheet conveyance direction with a sheet outlet of said erasing unit by a third sheet conveying means,
   said erasing unit comprises a subsidiary sheet conveying means for conveying said stimulable phosphor sheet from said sheet inlet to said erasing section, a subsidiary sheet conveying means for taking said stimulable phosphor sheet out of said erasing section and conveying it to an outlet side stacker, and said outlet side stacker positioned near said sheet outlet of said erasing unit, said output side stacker outputting the stimulable phosphor sheet that has been in said output side stacker for the longest time.

* * * * *